SIGNAL-TRANSLATING APPARATUS FOR MODULATED WAVE SIGNALS

Filed Oct. 19, 1956

United States Patent Office 2,944,105

Patented July 5, 1960

2,944,105

SIGNAL-TRANSLATING APPARATUS FOR MODULATED WAVE SIGNALS

Bernard D. Loughlin, Huntington, N.Y., assignor to Hazeltine Research, Inc., Chicago, Ill., a corporation of Illinois Filed Oct. 19, 1956, Ser. No. 617,041

10 Claims. (Cl. 178—5.4)

*General*

Figure 1:
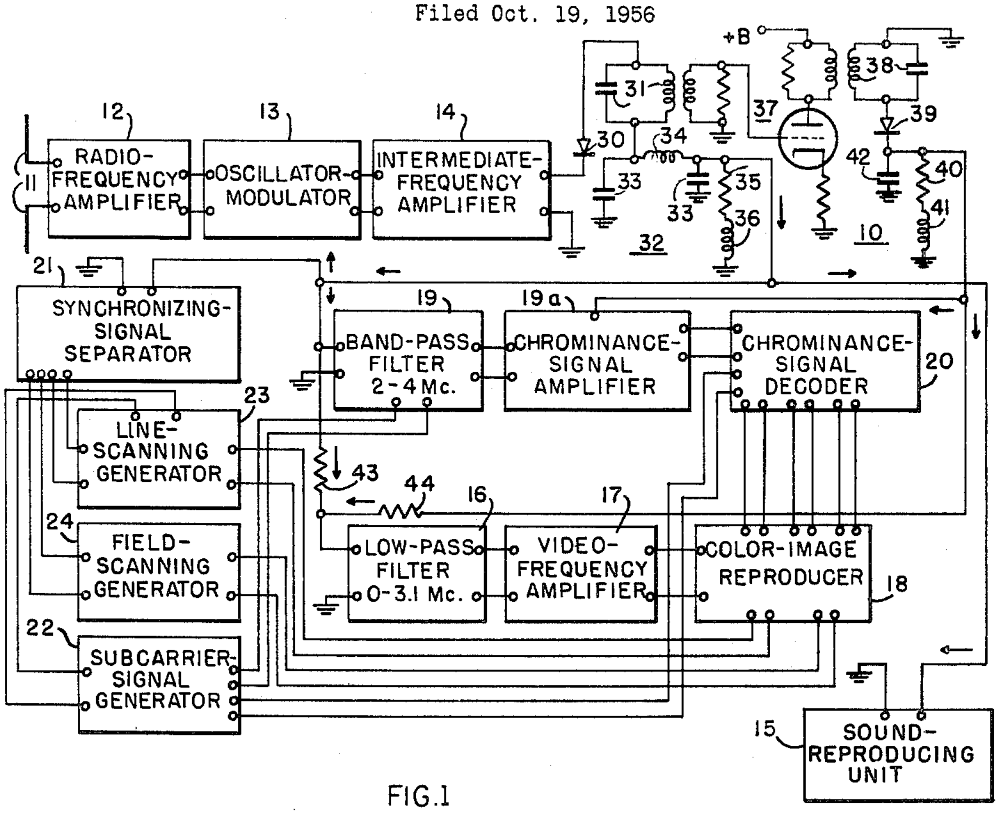

This invention relates to signal-translating apparatus for modulated wave signals and, more particularly, to signal-translating apparatus for televised color picture wave signals.

Heretofore, color-television receivers employing linear envelope picture-signal detectors, in general, have been subject to picture distortion inherently caused by such a detector upon the application thereto of an intermediate-frequency signal modulated by a composite video signal having luminance and chrominance components. In particular, the reproduced picture ordinarily suffers luminance and chrominance distortion, namely, luminance and chrominance suppression in negative modulation transmission systems. This distortion arises because the presence of a single-side-band chrominance subcarrier signal at the detector causes an effective envelope variation of the luminance carrier signal and vice versa. The detector responds to this envelope variation and therefore develops a distortion component.

Also, in receivers of the intercarrier type, the sound carrier signal is applied to the picture-signal detector and its presence together with the chrominance subcarrier signal causes the detector to derive a sound-color beat note appearing as a 920-kilocycle luminance distortion component. Heretofore, this distortion component has been tolerated in some receivers or minimized by attenuating the sound carrier to an extreme degree in stages prior to the detector. Such extreme attenuation of the sound carrier is undesirable in an intercarrier type of television receiver in which the beat note between the picture carrier and the sound carrier is utilized in the sound-reproducing unit because the signal-to-noise ratio is undesirably low for weak sound signals and also additional sound amplification must be supplied in later stages.

Attenuation of the sound carrier also ordinarily results in some amplitude or phase distortion of the color subcarrier because of the close frequency spacing between the two signals, resulting in color distortion.

It is an object of the present invention, therefore, to provide a new and improved signal-translating apparatus for modulated wave signals which avoids one or more of the above-mentioned disadvantages and limitations of prior such systems.

It is another object of the invention to provide a new and improved signal-translating apparatus for televised color picture wave signals in which picture distortion is substantially reduced.

It is another object of the invention to provide a new and improved signal-translating apparatus for televised color picture wave signals in which luminance distortion is substantially reduced.

It is another object of the invention to provide a new and improved signal-translating apparatus for televised color picture wave signals in which chrominance distortion is substantially reduced.

It is another object of the invention to provide a new and improved signal-translating apparatus for televised color picture wave signals in which a 920-kilocycle luminance distortion component caused by beating together of the sound carrier and color subcarrier is substantially reduced.

It is another object of the invention to provide a new and improved signal-translating apparatus for a radio receiver capable of substantially reducing output-signal distortion.

In accordance with a particular form of the invention, in a wave-signal receiver susceptible to output-signal distortion, signal-translating apparatus comprises first circuit means for supplying a modulated carrier wave signal and a modulated wave-signal component effectively in single-side-band relation thereto. The apparatus also includes detector circuit means including an output circuit and coupled to the supply circuit means for deriving in the output circuit a signal component representative of the modulation of the carrier wave signal or the modulated component but subject to distortion introduced by the single-side-band relation of the carrier wave signal and the modulated component. The apparatus also includes second circuit means coupled to the detector circuit means and responsive to a distortion component at a harmonic of the difference frequency between the carrier wave signal and the modulated component for deriving therefrom a component representative of a distortion component of the derived signal component at one or more levels of the modulation of the carrier wave signal. The apparatus finally includes means coupling the output and the second circuit means for substantially reducing the distortion of the derived signal component.

For a better understanding of the present invention, together with other and further objects thereof, reference is had to the following description taken in connection with the accompanying drawing, and its scope will be pointed out in the appended claims.

Figure 2:
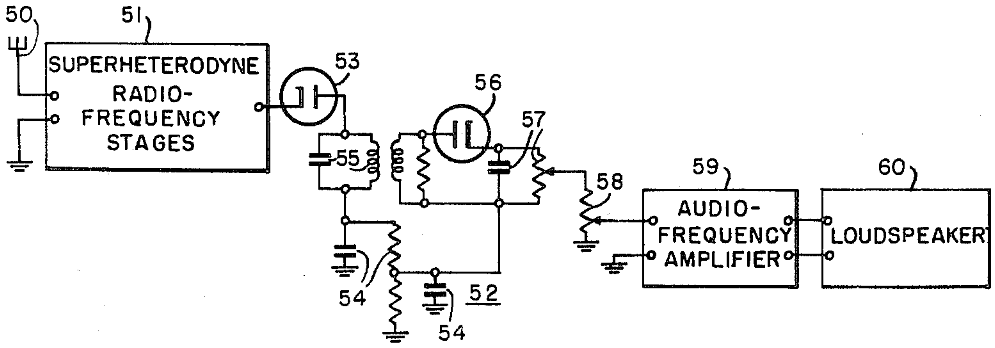

Referring to the drawing:

Fig. 1 is a circuit diagram, partly schematic, of a color-television receiver including signal-translating apparatus constructed in accordance with the invention, and Fig. 2 is a circuit diagram, partly schematic, of a radio receiver including apparatus constructed in accordance with the invention.

*General description and explanation of operation of Fig. 1 receiver*

Referring now more particularly to Fig. 1 of the drawing, the color-television receiver there represented may be of conventional construction with the exception of signal-translating apparatus including the detector system 10 and chrominance-signal amplifier 19*a* constructed in accordance with the invention. For example, the receiver may be of a constant luminance type described and claimed in applicant's copending application Serial No. 159,212, filed May 1, 1950, now Patent No. 2,773,929 and entitled "Color-Television System." Receivers of this type are further described in the October, 1951 issue of the Proceedings of the I.R.E. in an article entitled "Recent Improvements in Band-Shared Simultaneous Color-Television Systems," by applicant and in an article by Hirsch, Bailey, and applicant entitled "Principles of NTSC Compatible Color Television," Electronics, February, 1952.

The Fig. 1 receiver comprises an antenna system 11 to which are coupled, in cascade and in the order named, a radio-frequency amplifier 12, an oscillator-modulator 13, and an intermediate-frequency amplifier 14, all of conventional construction for deriving an intermediate-frequency composite color-television signal. The detector system 10, included in apparatus constructed in accordance with the invention and more fully described subsequently, is coupled to intermediate-frequency amplifier 14 for deriving from the intermediate-frequency signal applied thereto a composite video signal including luminance and chrominance components as well as a sound intercarrier beat-note signal. The output circuit of the detector system 10 is coupled to a sound-reproducing unit 15 of conventional construction. The output circuit of the detector system 10 is also coupled to a luminance channel and a chrominance channel of the receiver. The luminance channel includes a low-pass filter 16 having a pass band of, for example, 0–3.1 megacycles and coupled through a video-frequency amplifier 17 to a color-image reproducer 18, all of conventional construction. The filter 16 rejects the chrominance subcarrier signal while translating the luminance signal for amplification by the amplifier 17 and application to the reproducer 18 in a usual manner.

The chrominance channel of the receiver includes a band-pass filter 19 having a pass band of, for example, 2–4 megacycles coupled through a chrominance-signal amplifier 19*a*, of controllable gain and described subsequently, to a chrominance-signal decoder 20 of conventional construction for deriving, for example, R–Y, G–Y, and B–Y chrominance signals for application to the reproducer 18. One output circuit of the band-pass filter 19 is coupled to a gated input circuit of a stabilized subcarrier signal generator 22, of conventional phase-controlled oscillator design and responsive to the color burst synchronizing signal. The unit 22 has a pair of output circuits connected to input circuits of the chrominance-signal decoder 20 for providing a pair of phase-displaced unmodulated subcarrier signals, for example, signals in phase-quadrature which individually beat with the modulated signal component applied to the decorder 20 by the filter 19 to derive in the decoder 20 the R–Y, G–Y, and B–Y color-difference signals.

The output circuit of the detector system 10 is also coupled to a synchronizing-signal separator 21 for separating the line-synchronizing and field-synchronizing signals from the video-frequency signals applied thereto by the system 10.

The receiver also includes line-scanning and field-scanning generators 23 and 24 connected in a conventional manner to separator 21 and to the scanning circuits of the color-image reproducer 18 for effecting scanning. The output circuit of the line-scanning generator 23 is also connected to the gated circuit of the subcarrier signal generator 22 for separating the color burst synchronizing signal by means of a gating operation to control the oscillator phase.

*Description of signal-translating apparatus of Fig. 1 receiver*

Referring again to Fig. 1 of the drawing, signal-translating apparatus constructed in accordance with the invention comprises the detector system 10 for substantially reducing distortion of the luminance-signal component and includes the chrominance-signal amplifier 19*a* for substantially reducing distortion of the chrominance-signal component.

The signal-translating apparatus comprises circuit means for supplying a modulated carrier wave signal and a modulated wave-signal component effectively in single-side-band relation thereto. This circuit means comprises the output circuit of the intermediate-frequency amplifier 14 for supplying a picture carrier signal modulated by a video-frequency luminance-signal component effective as a negative modulation component and single-side-band modulated by a video-frequency chrominance subcarrier signal component and for supplying a sound carrier signal.

The apparatus also includes detector circuit means coupled to the supply circuit means for deriving a signal component representative of the modulation of the carrier wave signal or the modulated component but subject to distortion introduced by the single-side-band relation of the carrier wave signal and the modulated component. The detector circuit means comprises, for example, a linear envelope detector for deriving a signal component representative of the luminance-signal component but subject to distortion, namely, luminance suppression in negative modulation systems, introduced by the chrominance subcarrier component and for deriving a signal component representative of the chrominance subcarrier signal component but subject to distortion introduced by the luminance-signal component. The derived luminance-signal component is also subject to a distortion component introduced by the chrominance subcarrier component and the sound carrier signal and having a frequency equal to the difference frequency between the chrominance subcarrier component and the sound carrier signal.

The envelope detector comprises, for example, a diode 30 coupled through a resonant circuit 31, described subsequently, to a conventional video-frequency load circuit 32 including intermediate-frequency by-pass condensers 33, 33, an intermediate choke 34, a load resistor 35, and peaking inductor 36. The load circuit is coupled through a resistor 43, proportioned as described subsequently, to the low-pass filter 16.

The apparatus also includes circuit means coupled to the detector circuit means and responsive to a distortion component at a harmonic of the difference frequency between the carrier wave signal and the modulated component for deriving therefrom a component representative of a distortion component of the aforesaid derived signal component at one or more levels of the modulation of the carrier wave signal for substantially reducing the distortion of the derived signal component. More particularly, this circuit means comprises second detector circuit means responsive to a distortion component of the luminance-signal component at a harmonic frequency, preferably the second harmonic frequency of the chrominance subcarrier signal component, for deriving therefrom a low-frequency component representative of a low-frequency distortion component of the derived luminance-signal component for substantially reducing the same. The derived low-frequency distortion component is also representative of a distortion component of the chrominance-signal component for substantially reducing that distortion.

The second detector circuit means includes the resonant circuit 31 tuned to the second harmonic frequency of the chrominance subcarrier signal component, that is, tuned to approximately 7.2 megacycles, and coupled to an amplifier 37 of conventional construction having an output circuit 38 also tuned to the second harmonic frequency of the subcarrier signal component.

The second detector circuit means also includes a diode 39 having a load circuit including a resistor 40, an inductor 41, and a by-pass condenser 42 responsive to low-frequency signal variations extending up to, for example, 2 megacycles.

The second detector circuit means also includes circuit means for combining the luminance-signal component and the low-frequency distortion component derived by that detector with such proportions and polarities that the derived distortion component substantially opposes the corresponding distortion component of the luminance-signal component for substantially reducing the same. This circuit means includes the resistor 43 coupled to the load circuit 32 of the first detector and a resistor 44 coupled between the load circuit 40, 41, 42 and the filter 16. The resistors 43 and 44 are proportioned with respect to the amplitude of the distortion components derived in their respective load circuits to supply approximately equal distortion components of opposite polarity to the low-pass filter 16.

The second detector circuit means also includes controllable gain repeater circuit means for translating the derived chrominance subcarrier component and responsive to the derived low-frequency distortion component which is effective to vary the gain in accordance therewith for substantially reducing the distortion component of the chrominance subcarrier signal component. This controllable gain repeater circuit means comprises the chrominance-signal amplifier 19a which may be a variable gain amplifier of conventional construction having a gain control input circuit coupled to the load circuit 40, 41, 42. This input circuit may be nonresponsive to signal variations above 500 kilocycles in frequency.

*Operation of signal-translating apparatus of Fig. 1 receiver*

Considering now the operation of the signal-translating apparatus of the Fig. 1 receiver, the intermediate-frequency amplifier 14 supplies an intermediate-frequency picture carrier signal modulated by a video-frequency luminance-signal component and single-side-band modulated by a video-frequency chrominance subcarrier signal component and a sound carrier signal. The diode 30 derives the luminance and chrominance subcarrier signal components and the sound carrier signal in its load circuit 32. The sound-reproducing unit 15 responds to the sound carrier signal in a usual manner. The low-pass filter 16 responds to the luminance-signal component, and the band-pass filter 19 translates the chrominance-signal component. However, as will be demonstrated subsequently, in mathematical terms, the luminance-signal and chrominance subcarrier components are subject to distortion caused by the operation of the diode 30 and its load circuit 32 in the presence of the intermediate-frequency signal modulated by both the luminance-signal and the chrominance subcarrier signal components. This distortion includes a low-frequency distortion component affecting the average and low-frequency values of the luminance-signal component, a distortion component at the fundamental subcarrier frequency, and a distortion component at the second harmonic of subcarrier frequency. The low-pass filter 16 translates the luminance-signal and distortion components below the fundamental subcarrier frequency and, thus, the translated luminance-signal component is subject to low-frequency distortion. This low-frequency distortion appears as a suppression of the luminance of the reproduced image. This is so because the distortion component increases the instantaneous magnitude of the component derived in the detector output circuit and the received television signal contains a negative modulation luminance-signal component, that is, a luminance-signal component which modulates the carrer to represent white by a minimum carrier amplitude and black by a greater carrier amplitude.

The luminance-signal component is also subject to a low-frequency distortion component arising because of the operation of the diode 30 and its load circuit 32 in the presence of the chrominance subcarrier signal component and the sound carrier signal. This distortion component appears as a component at the difference frequency between the chrominance subcarrier signal component and the sound carrier signal, namely, 920 kilocycles which is within the pass band of the filter 16.

The band-pass filter 19 responds to the chrominance subcarrier component applied thereto by the load circuit 32. This subcarrier component is subject to the distortion component at the fundamental subcarrier frequency derived in the load circuit 32. The other distortion components are rejected by the band-pass filter 19.

As will be demonstrated subsequently, the distortion component at the second harmonic of the fundamental subcarrier frequency has a low-frequency variation component which is representative of the low-frequency distortion component of the luminance-signal component and which, at a given luminance level, is also representative of variations of the distortion component at the fundamental chrominance subcarrier frequency.

The second harmonic distortion component is selected and utilized as follows. The resonant circuit 31 supplies to the amplifier 37 a signal component at 7.2 megacycles representing the second harmonic distortion component of the derived signals. This second harmonic distortion component is amplified and derived in the circuit 38 which applies that component to the diode 39. Accordingly, there is derived in the load circuit 40, 41, 42 a low-frequency signal component representing the amplitude variations of the second harmonic distortion component. The derived low-frequency distortion component is applied through resistor 44 to the low-pass filter 16 with such amplitude and polarity as substantially to oppose and cancel the corresponding distortion component of the derived luminance-signal component.

The low-frequency component derived in the load circuit 40, 41, 42 from the second harmonic distortion component is also applied to the chrominance-signal amplifier 19a to vary the gain of that amplifier in such manner as to reduce substantially at a given luminance level the distortion of the chrominance subcarrier signal component translated through the chrominance channel 19, 19a, 20. Accordingly, the luminance and chrominance subcarrier signal components applied to the reproducer have substantially reduced distortion components.

Considering now the operation of the signal-translating apparatus in mathematical terms, the signal developed in the output circuit of the intermediate-frequency amplifier 14 may be represented by the following equation:

$$e = m_1 \cos \omega_1 t + m_2 \cos (\delta + \omega_1) t \qquad (1)$$

where $e$=instantaneous magnitude of the composite carrier signal including its chrominance subcarrier $m_1$=instantaneous picture carrier-signal amplitude level (exclusive of chrominance subcarrier)

$\omega_1$=intermediate-frequency picture carrier angular velocity $m_2$=instantaneous chrominance subcarrier signal amplitude $\delta$=difference angular velocity between intermediate-frequency picture carrier and intermediate-frequency chrominance subcarrier signals (which is the video chrominance subcarrier angular velocity).

It may be shown that the envelope variation (V) resulting from the two signal components represented by Equation (1) is:

$$V = [m_1^2 + m_2^2 + 2m_1 m_2 \cos \delta t]^{1/2} \qquad (2)$$

Rewriting Equation (2):

$$V = (m_1^2 + m_2^2)^{1/2}(1 + a \cos \delta t)^{1/2} \qquad (3)$$

where $$a = \frac{2m_1 m_2}{m_1^2 + m_2^2} \qquad (3a)$$

Equation (3) may be analyzed in terms of a power series with corresponding frequency terms collected as follows:

$$e_0 = (m_1^2 + m_2^2)^{1/2}\left(1 - \frac{a^2}{16} - \frac{15a^4}{1024} \cdots\right) \qquad (4)$$

$$e_1 = (m_1^2 + m_2^2)^{1/2}\frac{a}{2}\left(1 + \frac{3a^2}{32} + \frac{35a^4}{1024} \cdots\right) \qquad (5)$$

$$e_2 = (m_1^2 + m_2^2)^{1/2}\left(-\frac{a^2}{16} - \frac{5a^4}{256} \cdots\right) \qquad (6)$$

where $e_0, e_1, e_2$=amplitude of the direct-current, fundamental chrominance subcarrier frequency, and second harmonic terms, respectively, of the envelope variation, Let:

$$r=\frac{m_2}{m_1} \qquad (7)$$

Then from Equations (3*a*) and (7):

$$a=\frac{2r}{1+r^2} \qquad (8)$$

Rewriting Equations (4)–(6), inclusive, with substitutions from Equations (7) and (8):

$$e_0=m^1\left(1+\frac{1}{4}r^2+\frac{1}{64}r^4\ \ldots\right) \qquad (9)$$

$$e_1=m_1r\left(1-\frac{1}{8}r^2-\frac{1}{64}r^4\ \ldots\right) \qquad (10)$$

$$e_2=-m_1\left(\frac{r^2}{4}-\frac{1}{16}r^4\ \ldots\right) \qquad (11)$$

In the following considerations, the terms of Equations (9), (10), and (11) of higher order than fourth power will be neglected because of their small amplitudes.

The amplitude of the desired direct-current or luminance component is represented by that term of Equation (9) independent of $r^2$ and higher order terms and may be expressed:

$$e_{od}=m_1 \qquad (12)$$

The amplitude of the luminance distortion component is presented by the terms of Equation (9) expressed as follows:

$$e_{ou}=m_1\left(\frac{1}{4}r^2+\frac{1}{64}r^4\right) \qquad (13)$$

The second harmonic term represented by Equation (11) is a distortion component in its entirety.

From Equations (11) and (13) it will be seen that the absolute value of the amplitude of the second harmonic distortion component represented by Equation (11) is approximately the same as the absolute value of the amplitude of the luminance distortion component represented by Equation (13). This is so because the $r^4$ terms are small relative to the $r^2$ terms for normal values of up to, for example, $r=.7$ which covers the range of values of $r$ for the normally reproduced picture.

The diode 39 and its associated load circuit derive a low-frequency component of opposite polarity to the distortion component of the signal derived by the diode 30 and its associated load circuit. Accordingly, by properly selecting the gain of amplifier 37 and the values of resistors 43 and 44, a low-frequency component having the absolute value of the amplitude expressed by Equation (11) is applied to the filter 16 to cancel to a substantial extent the luminance distortion component represented by Equation (13) as applied to the filter 16. The gain of amplifier 37 and the values of resistors 43 and 44 preferably are proportioned to provide substantially complete cancellation of the low-frequency luminance-signal distortion component over a range including a medium value of the ratio $r$, for example, $r=.6$.

The term of Equation (10) expressed in parentheses is a gain factor where $$-\frac{1}{8}r^2-\frac{1}{64}r^4$$

is the undesired portion of the gain factor. It will be seen that the amplitude of the second harmonic term expressed by Equation (11) is approximately representative of the undesired portion of the gain factor for a value of $$m_1=\frac{1}{2}$$

Accordingly, the gain-control sensitivity of the amplifier 19*a* may be proportioned to provide a gain varying with the amplitude of the second harmonic term expressed by Equation (11) to reduce chrominance distortion at a medium luminance level of, for example, $$m_1=\frac{1}{2}$$

or at any other desired luminance level.

*Description of Fig. 2 radio receiver*

Referring now to Fig. 2 of the drawing, there is represented a radio receiver comprising an antenna 50 and superheterodyne radio-frequency stages 51, of conventional construction, tunable to the broadcast band and including, for example, a radio-frequency amplifier, oscillator-modulator, and intermediate-frequency amplifier.

The receiver also includes signal-translating apparatus 52 constructed in accordance with the invention. The signal-translating apparatus includes circuit means for supplying a first modulated carrier wave signal and a second modulated carrier wave signal effectively in single-side-band relation thereto. This circuit means comprises the output circuit of the unit 51 which supplies a desired carrier wave signal and its adjacent channel carrier signal spaced by 10 kilocycles therefrom. The signal-translating apparatus also includes detector circuit means comprising an envelope detector 53 and audio-frequency load circuit 54 for deriving a signal component representative of the modulation of the desired carrier signal but subject to distortion introduced by the undesired carrier signal.

The apparatus also includes circuit means coupled to the detector circuit means and responsive to a distortion component at the second harmonic of the difference frequency between the carrier signals for deriving therefrom an audio-frequency distortion component representative of a corresponding distortion component of the derived audio signal for substantially reducing the distortion. In particular, this circuit means comprises a resonant circuit 55 tuned to 20 kilocycles and coupled to another detector circuit, including the diode 56, for deriving in load circuit 57 a low frequency component representative of the distortion of the audio signal derived in the load circuit 54. The resistor 57 is adjustable to allow a combination of the distortion components derived in the load circuits 54 and 57 to cancel the distortion of the signal derived in the circuit 54. The tap of the resistor 57 is connected to an adjustable voltage divider serving as a conventional volume control. The voltage divider 58 is coupled through an audio-frequency amplifier 59 of conventional construction to a loudspeaker 60.

*Operation of signal-translating apparatus of Fig. 2 receiver*

The operation of the signal-translating apparatus of the Fig. 2 receiver is generally analogous to the operation of the signal-translating apparatus of the Fig. 1 color-television receiver. The superheterodyne radio-frequency stages 51 apply a desired carrier wave signal and an undesired adjacent channel carrier wave signal to the detector 53 which derives the modulation components of the desired signal across the load circuit 54. However, due to the operation of the detector in the presence of the undesired carrier signal, modulation components of the undesired carrier signal are effectively derived in the load circuit 54.

The resonant circuit 55 and the detector 56 and load circuit 57 respond to the second harmonic of the difference frequency for deriving a low-frequency distortion component which can be employed to cancel the low-frequency distortion components derived in the circuit 54 by proper adjustment of the resistor 57.

From the foregoing description of the Fig. 1 embodiment, it will be apparent that signal-translating apparatus constructed in accordance with the invention has the advantage that it is capable of substantially reducing picture distortion in a color-television receiver. In particular, it is capable of substantially reducing luminance distortion and chrominance distortion. Further, the apparatus is capable of substantially reducing the distortion due to the beat note of the sound carrier and chrominance subcarrier signal components. As explained in connection with the Fig. 2 embodiment, the invention also has use in a radio receiver where it is capable of substantially reducing distortion due to adjacent channel interference.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a wave-signal receiver susceptible to output-signal distortion, signal-translating apparatus comprising: first circuit means for supplying a modulated carrier wave signal and a modulated wave-signal component effectively in single-side-band relation thereto; detector circuit means including an output circuit and coupled to said supply circuit means for deriving in said output circuit a signal component representative of the modulation of said carrier wave signal or said modulated component but subject to distortion introduced by the single-side-band relation of said carrier wave signal and said modulated component; second circuit means coupled to said detector circuit means and responsive to a distortion component at a harmonic of the difference frequency between said carrier wave signal and said modulated component for deriving therefrom a component representative of a distortion component of said derived signal component at one or more levels of the modulation of said carrier wave signal; and means coupling said output circuit and said second circuit means for substantially reducing the distortion of said derived signal component.

2. In a color-television receiver susceptible to luminance distortion of the reproduced image, signal-translating apparatus comprising: first circuit means for supplying a picture carrier signal modulated by a video-frequency luminance-signal component and single-side-band modulated by a video-frequency chrominance subcarrier signal component; detector circuit means including an output circuit and coupled to said supply circuit means for deriving in said output circuit a signal component representative of said luminance-signal component but subject to distortion introduced by said chrominance subcarrier component; second circuit means coupled to said detector circuit means and responsive to a distortion component of said luminance-signal component at a harmonic frequency of said chrominance subcarrier signal component for deriving therefrom a component representative of a distortion component of said derived luminance-signal component; and means coupling said output circuit and said second circuit means for substantially reducing the same.

3. In a color-television receiver susceptible to luminance distortion of the reproduced image, signal-translating apparatus comprising: first circuit means for supplying a picture carrier signal modulated by a video-frequency luminance-signal component effective as a negative modulation component and single-side-band modulated by a video-frequency chrominance subcarrier signal component; detector circuit means including an output circuit and coupled to said supply circuit means for deriving in said output circuit a signal component representative of said luminance-signal component but subject to luminance suppression introduced by said chrominance subcarrier component; second circuit means coupled to said detector circuit means and responsive to a distortion component of said luminance-signal component at a harmonic frequency of said chrominance subcarrier signal component for deriving therefrom a low-frequency component representative of a low-frequency distortion component of said derived luminance-signal component; and means coupling said output circuit and said second circuit means for substantially reducing the same.

4. In a color-television receiver susceptible to luminance distortion of the reproduced image, signal-translating apparatus comprising: first circuit means for supplying a picture carrier signal modulated by a video-frequency luminance-signal component and single-side-band modulated by a video-frequency chrominance subcarrier signal component and for supplying a sound carrier signal; detector circuit means including an output circuit and coupled to said supply circuit means for deriving in said output circuit a signal component representative of said luminance-signal component but subject to a distortion component introduced by said chrominance subcarrier component and said sound carrier signal at the difference frequency between said chrominance subcarrier component and said sound carrier signal; second circuit means coupled to said detector circuit means and responsive to a distortion component of said luminance-signal component at a harmonic frequency of said chrominance subcarrier signal component for deriving therefrom a low-frequency component representative of said distortion component of said derived luminance-signal component; and means coupling said output circuit and said second circuit means for substantially reducing the same.

5. In a color-television receiver susceptible to luminance distortion of the reproduced image, signal-translating apparatus comprising: first circuit means for supplying a picture carrier signal modulated by a video-frequency luminance-signal component and single-side-band modulated by a video-frequency chrominance subcarrier signal component; an envelope detector including an output circuit and coupled to said supply circuit means for deriving in said output circuit a signal component representative of said luminance-signal component but subject to distortion introduced by said chrominance subcarrier component; second circuit means coupled to said detector and responsive to a distortion component of said luminance-signal component at a harmonic frequency of said chrominance subcarrier signal component for deriving therefrom a low-frequency component representative of a low-frequency distortion component of said derived luminance-signal component; and means coupling said output circuit and said second circuit means for substantially reducing the same.

6. In a color-television receiver susceptible to luminance distortion of the reproduced image, signal-translating apparatus comprising: circuit means for supplying a picture carrier signal modulated by a video-frequency luminance-signal component and single-side-band modulated by a video-frequency chrominance subcarrier signal component; first detector circuit means including an output circuit and coupled to said supply circuit means for deriving in said output circuit a signal component representative of said luminance-signal component but subject to distortion introduced by said chrominance subcarrier component; second detector circuit means coupled to said first detector circuit means and responsive to a distortion component of said luminance-signal component at the second harmonic frequency of said chrominance subcarrier signal component for deriving therefrom a low-frequency component representative of a low-frequency distortion component of said derived luminance-signal component; and means coupling said output circuit and said second detector circuit means for substantially reducing said low-frequency distortion component.

7. In a color-television receiver susceptible to luminance distortion of the reproduced image, signal-translating apparatus comprising: circuit means for supplying a picture carrier signal modulated by a video-frequency luminance-signal component and single-side-band modulated by a video-frequency chrominance subcarrier signal component; detector circuit means including an output circuit and coupled to said supply circuit means for deriving in said output circuit a signal component representative of said luminance-signal component but subject to distortion introduced by said chrominance subcarrier component; circuit means coupled to said detector circuit means and responsive to a distortion component of said luminance-signal component at a harmonic frequency of said chrominance subcarrier signal component for deriving therefrom a low-frequency component representative of a low-frequency distortion component of said derived luminance-signal component; and another circuit means coupled to said output circuit and said one circuit means for combining said luminance-signal component and said derived low-frequency distortion component with such proportions and polarities that said derived distortion component substantially opposes the corresponding distortion component of said luminance-signal component thereby substantially reducing the same.

8. In a color-television receiver susceptible to chrominance distortion of the reproduced image, signal-translating apparatus comprising: first circuit means for supplying a picture carrier signal modulated by a video-frequency luminance-signal component and single-side-band modulated by a video-frequency chrominance subcarrier signal component; detector circuit means including an output circuit and coupled to said supply circuit means for deriving in said output circuit a signal component representative of said chrominance subcarrier signal component but subject to distortion introduced by said luminance-signal component and for deriving a signal component representative of said luminance-signal component but subject to distortion introduced by said chrominance subcarrier component; second circuit means coupled to said detector circuit means and responsive to a distortion component of said luminance-signal component at a harmonic frequency of said chrominance subcarrier signal component for deriving therefrom a low-frequency component representative of a distortion component of said chrominance-signal component at a given level of said luminance-signal component; and means coupling said output circuit and said second circuit means for substantially reducing the distortion of said chrominance-signal component.

9. In a color-television receiver susceptible to chrominance distortion of the reproduced image, signal-translating apparatus comprising: first circuit means for supplying a picture carrier signal modulated by a video-frequency luminance-signal component and single-side-band modulated by a video-frequency chrominance subcarrier signal component; detector circuit means including an output circuit and coupled to said supply circuit means for deriving in said output circuit a signal component representative of said chrominance subcarrier signal component but subject to distortion introduced by said luminance-signal component and for deriving in said output circuit a signal component representative of said luminance-signal component but subject to distortion introduced by said chrominance subcarrier component; second circuit means coupled to said detector circuit means and responsive to a distortion component of said luminance-signal component at a harmonic frequency of said chrominance subcarrier signal component for deriving therefrom a low-frequency component representative of a distortion component of said chrominance-signal component at a given level of said luminance-signal component; and means including controllable gain repeater circuit means for translating said derived chrominance subcarrier component and responsive to said derived low-frequency distortion component which is effective to vary the gain in accordance therewith for substantially reducing said distortion component of said chrominance subcarrier signal component.

10. In a wave-signal receiver susceptible to output-signal distortion, signal-translating apparatus comprising: first circuit means for supplying a first modulated carrier wave signal and a second modulated carrier wave signal effectively in single-side-band relation thereto; detector circuit means including an output circuit and coupled to said supply circuit means for deriving in said output circuit a signal component representative of the modulation of said first carrier wave signal but subject to distortion introduced by said second carrier wave signal; second circuit means coupled to said detector circuit means and responsive to a distortion component at a harmonic of the difference frequency between said carrier wave signals for deriving therefrom a component representative of a distortion component of said derived signal component; and means coupling said output circuit and said second circuit means for substantially reducing the same.

References Cited in the file of this patent

UNITED STATES PATENTS

| | | |
|---|---|---|
| 2,183,731 | Wright | Dec. 19, 1939 |
| 2,379,699 | Ford | July 3, 1945 |
| 2,700,698 | Hammond | Jan. 25, 1955 |
| 2,790,848 | Koch | Apr. 30, 1957 |
| 2,819,334 | Squires | Jan. 7, 1958 |